United States Patent
Porteous et al.

[19]

[11] Patent Number: 6,009,952
[45] Date of Patent: Jan. 4, 2000

[54] METHOD OF PROTECTING A HORSE'S HOOF AND PRODUCT

[76] Inventors: Don D. Porteous; Frank Rovelli, both of 600 E. Hueneme Rd., Oxnard, Calif. 93033

[21] Appl. No.: 09/098,820

[22] Filed: Jun. 17, 1998

Related U.S. Application Data

[60] Provisional application No. 60/083,464, Apr. 29, 1998.

[51] Int. Cl.$^7$ ...................................................... A01L 7/02
[52] U.S. Cl. .................................................................. 168/28
[58] Field of Search ............................ 168/4, 28, DIG. 1; 606/212

[56] References Cited

U.S. PATENT DOCUMENTS

| | | | |
|---|---|---|---|
| 3,630,289 | 12/1971 | Norberg | 168/28 |
| 4,182,340 | 1/1980 | Spencer | 128/336 |
| 4,565,250 | 1/1986 | Vasko | 168/12 |
| 4,691,782 | 9/1987 | Stine | 168/12 |
| 4,869,400 | 9/1989 | Jacobs | 222/137 |
| 4,917,192 | 4/1990 | Monticello | 168/4 |
| 5,199,498 | 4/1993 | Knudsen | 168/28 |
| 5,222,561 | 6/1993 | Fisher et al. | 168/12 |
| 5,330,008 | 7/1994 | Sigafoos et al. | 168/28 |
| 5,451,629 | 9/1995 | Jacobs | 524/439 |
| 5,505,264 | 4/1996 | Morris et al. | 168/12 |
| 5,698,623 | 12/1997 | Jacobs | 524/440 |
| 5,699,861 | 12/1997 | Sigafoos | 168/17 |
| 5,706,898 | 1/1998 | Beadle | 168/28 |

FOREIGN PATENT DOCUMENTS

| | | | |
|---|---|---|---|
| 308309 | 3/1989 | European Pat. Off. | 168/4 |
| 673451 | 1/1930 | France | 168/28 |
| 2641942 | 7/1990 | France | 168/28 |
| 37591 | 4/1886 | Germany | 168/28 |
| 39669 | 10/1886 | Germany | 168/28 |
| 132785 | 7/1902 | Germany | 168/28 |
| 272466 | 12/1911 | Germany | 168/28 |
| 2630444 | 1/1978 | Germany | 168/4 |
| 3841925 | 6/1989 | Germany | 168/DIG. 1 |
| 8323 | of 1890 | United Kingdom | 168/28 |
| 18964 | of 1900 | United Kingdom | 168/28 |
| 1290 | of 1904 | United Kingdom | 168/28 |
| 1125 | of 1905 | United Kingdom | 168/28 |
| 1405211 | 9/1975 | United Kingdom | 168/DIG. 1 |
| WO094006285A1 | 3/1994 | WIPO | 168/4 |

*Primary Examiner*—Michael J. Carone
*Assistant Examiner*—Fredrick T. French, III
*Attorney, Agent, or Firm*—Louis J. Bachand

[57] ABSTRACT

Horse hoof protection is obtained by incorporating a synthetic organic resin such as a urethane resin in the volume defined by the horse hoof bottom wall, suitably covered with a web fixed to the hoof bottom wall that is adhered to said resin. The resin protection is suitably free flowing into place, conforms to the contours of the hoof bottom wall, and adheres to the wall when cured. The protection by the resin is resilient and softer than the hoof wall and acts to cushion the hoof against shock.

22 Claims, 2 Drawing Sheets

METHOD OF PROTECTING A HORSE'S HOOF AND PRODUCT

REFERENCED TO RELATED APPLICATION

This application claims the benefit of United States Provisional application Ser. No. 60/083,464 filed Apr. 29, 1998.

BACKGROUND OF THE INVENTION

1. Technical Field

This invention relates to horse hoof protection, and more particularly to improved methods and products for the cushioning of the horse's hoof and the blocking of ingress of harmful debris into the sensitive frog portion of the hoof.

2. Related Art

Webs of leather, plastic or rubber, called pads, attached to the hoof wall, and sized to extend across the hoof sole and cover the frog portion of the hoof are sometimes inserted under the horseshoe to protect the sensitive areas of the hoof. Moisture or debris sometimes work their way into the open volume defined broadly by the hoof bottom wall comprising the hoof sole and frog, causing discomfort or harm to the animal. Efforts to fill the volume have involved adding resins to the sole and covering with the web. These expedients have not proved successful because of difficulties in handling the resins, available resins having too high viscosity to permit readily filling into the horse hoof volume, persistent resin tackiness, lack of fill of all interstices or voids within the volume, and undue final hardness of the resin. Further, known resins do not adhere to the web used to cover the hook frog, leaving space between the resin mass and the web or pad for incursions of debris.

SUMMARY OF THE INVENTION

It is an object of the invention to provide protection for horses' hoofs, and cushioning for horses' steps. It is a further object to provide a hoof packing method and product that flows easily and readily into the hoof volume and the interstices thereof yet sets up nearly immediately to a firm, somewhat resilient mass that adheres to the hoof volume walls against loss of the mass or incursions of debris. The invention method and product avoid the difficulties of resin tackiness, incursions of debris from loose or incomplete fill, undue hardness in the resin, and handling problems arising from use of putty-like or heavier resins which must be packed in rather than flowed in. It is a further object of the invention to provide a method of injecting resin into the volume defined by the hoof bottom wall, e.g. under a protecting web on a horse hoof or without such web, in which the interstices and surface voids of the volume are completely filled so that there is no incursion of debris, no handling problems with pasty or tacky resin systems, and the final result is a softer and more resilient mass than the horse hoof wall, the mass even being transparent to permit viewing of the horse's sole. Further it is an object to adhere the web or pad to the resin mass, making the hoof protection unitary and completely blocked against debris intrusion.

These and other objects of the invention to become apparent hereinafter are realized in the method of protecting a horse's hoof, including cleaning the open volume formed by the hoof bottom wall of debris, incorporating a rapidly curing synthetic organic resin into the volume, the resin having a viscosity such that the resin freely conforms to the contours of the hoof bottom wall, and curing the resin to a void-free solid in situ in hoof bottom wall adhering relation.

In this and like embodiments, typically, the method further includes selecting a urethane resin as the synthetic organic resin, the resin adhering to the hoof bottom wall; selecting as the synthetic organic resin an injectable resin, and injecting the resin into the volume against the hoof bottom wall in conforming relation therewith; and, where the volume has an open mouth, including also fixing a web across the volume open mouth, and thereafter incorporating the synthetic resin into the volume under the web, and curing; and, selecting as the synthetic resin a urethane resin having a cure time of less than about 2 minutes, the cured resin adhering to the hoof bottom wall and said web.

In a further embodiment, the invention provides the method of protecting a horse's hoof having a hoof bottom wall forming an open volume, including cleaning the open volume of debris, fixing a web across the open volume, and incorporating a free-flowing, rapidly curing synthetic organic resin adherent to the hoof wall under the web and into the volume in hoof bottom wall conforming relation, and curing the resin to a void-free solid in situ adherent to the hoof bottom wall.

In this and like embodiments, typically, the invention method can include fixing the web in place with nails, fasteners, adhesive, or otherwise into the hoof bottom wall; fixing the web to the hoof with a horseshoe secured to the hoof bottom wall; selecting as the resin a urethane resin; selecting as the urethane resin a urethane resin having a cure time of less than about 2 minutes; or, preferably, selecting as the urethane resin a urethane resin having a cure time of less than about 25 seconds; hydraulically filling the volume with the resin and adhering the resin to the web against debris incursions between said web and said resin.

In either or both of the foregoing embodiments, typically, the method includes selecting a resin which when finally cured is softer than the horny wall of the hoof and cushions the hoof against shock; and, selecting a resin which is transparent or at least translucent when cured, so that the hoof sole is visible through the resin.

In a further embodiment, the invention provides the method of protecting a horse's hoof having a hoof bottom wall defined by the hoof frog and sole and forming an open volume, including combining from a pair of cartridges into a static mixer separate reactive resin components forming a rapidly curing synthetic organic resin in an amount suitable for hydraulically filling the volume, conforming the resin to the contours of the hoof bottom wall, and curing the resin to a void-free solid in situ.

In this and like embodiments, typically, the method includes adhering the synthetic organic resin to the hoof bottom wall during resin cure; and, covering the open volume with a web comprising leather, rubber or a synthetic organic resin, the web being adhered to the resin.

In a further embodiment, the invention provides a protected horse hoof comprising a hoof and a hoof bottom wall forming an open volume and a void-free, solid synthetic organic resin conformed with and adhered to the hoof bottom wall in volume filling relation such that the hoof volume is free of unfilled voids and interstices.

In this and like embodiments, typically, the synthetic organic resin within the volume is covered by a web fixed to the hoof; the cured synthetic organic resin is softer than the horny wall of the hoof and cushions the hoof against shock; the synthetic organic resin is formed from reactive resin components injected into the volume at a viscosity adapted to substantially fill the smallest spaces in the volume and conform to the hoof bottom wall surfaces in adhering relation; the synthetic organic resin is a urethane resin; and the resin is sufficiently transparent that the horse hoof sole is visible therethrough.

In yet another embodiment, the invention provides the method of protecting a horse from injury during walking or running, including filling the open volume defined by the horse hoof wall with a synthetic organic resin, such as a urethane resin, which cures to be softer than and adherent to the horse hoof wall, and curing the resin to a void-free solid in situ.

BRIEF DESCRIPTION OF THE DRAWINGS

The invention will be further described in conjunction with the attached drawings in which.

DETAILED DESCRIPTION

Horse hoofs are conventionally shod by nailing a horseshoe to the horny wall forming the outer portion of the hoof. Within the horny wall are the sole of the hoof and the sensitive frog portion of the hoof, generally referred to herein jointly as the hoof bottom wall. These portions of the hoof are not protected from damage from contact with moisture or other forms of debris and harmful objects. It is a common practice to add a web across the hoof sole, usually supported by the horseshoe or horseshoe nails to protect the sole of the hoof. Debris can enter the open volume defined by the hoof bottom wall, even under the web unless the volume is filled with a suitable material. Suitable materials will fill all spaces in the volume ands prevent voids and interstices from occurring. In the past, foam resins have been employed, but they do not hold up against the stresses imposed in use and allow incursions of debris, moisture and contamination. Other materials are stiff and difficult to work with and like the foam systems do not adhere to the hoof bottom wall and thus allow, especially after wearing for a time, the incursion of debris which is uncomfortable and even harmful to the horse. The present invention uses a solid, noncellular, void-free resin to fill the open volume, suitably adherent to the hoof bottom wall against incursive attacks from debris and moisture even after a time of use. The preferred resins herein are injectable using dual cartridge dispensers which direct reactive components of low viscosity through a static mixer into the hoof volume where their initially low viscosity enables flow throughout the volume and into the nooks, crannies, interstices and voids of the volume and occurring on the hoof walls. The resin then sets up and adheres to the walls, void-free and more resilient than the surrounding hoof to cushion the steps of the horse while protecting from debris incursions.

Figure 1:
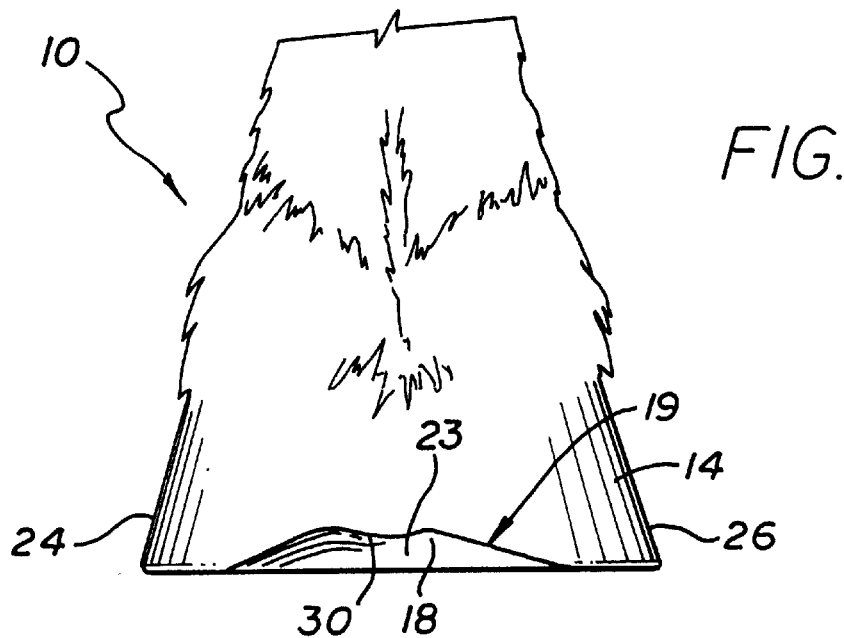
FIG. 1 is a view in elevation of an unshod horse hoof.
Figure 2:
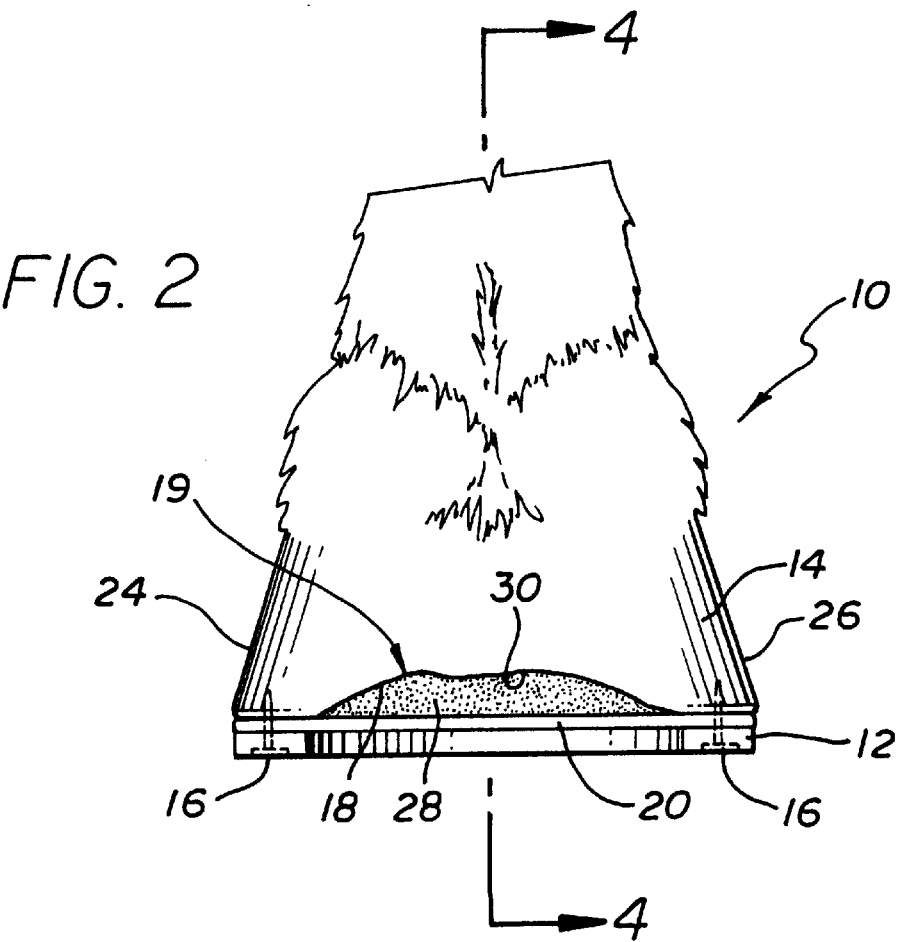
FIG. 2 is a view of the horse hoof after addition of a horseshoe, the web and the resin mass according to the invention.
Figure 3:
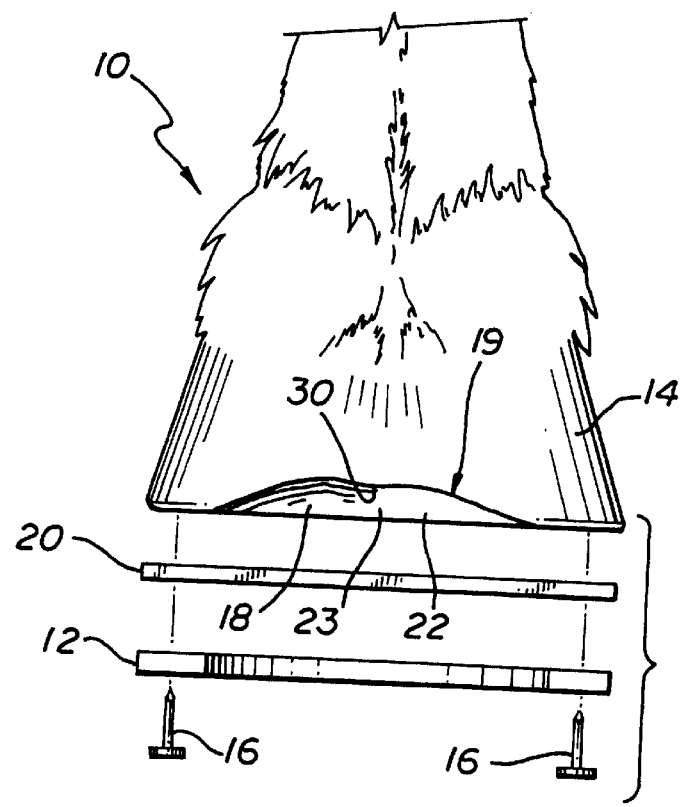
FIG. 3 is a view like FIG. 2, exploded.
Figure 4:
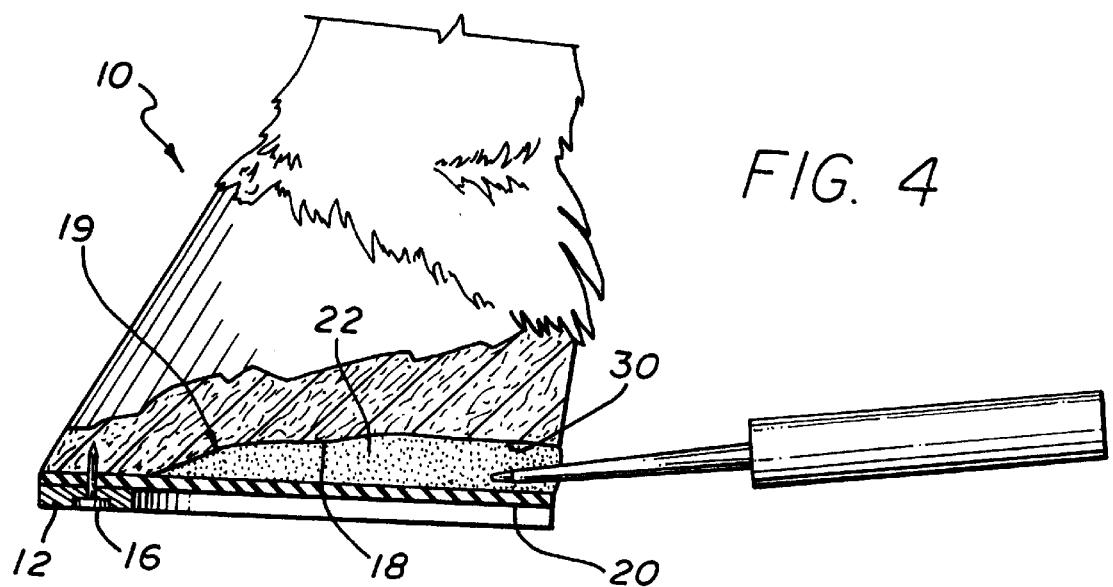
FIG. 4 is a view taken on line 4—4 in FIG. 2

With reference to FIGS. 1–4, the hoof 10 is shod with a shoe 12 fixed to the hoof wall 14 by nails 16. An optional leather, synthetic organic resin plastic, or rubber material web 20 is stretched across the hoof sole portion 18, and anchored there by the nails 16 and horseshoe 12. The web 20 can be also affixed by any other suitable means such as adhesive, clamps, and the like. The use of the web is not necessary with the present resin masses owing to their rapid increase in viscosity within the hoof volume 22 and their final adhesion to the hoof bottom wall 19 sole and frog portions, 18, 30.

The hoof open volume 22 is defined by the hoof bottom wall 19, comprising the hoof sole portion 18 and the hoof frog portion 30, has a mouth 23 which is closed by the web 20 extending laterally between the left and right portions 24, 26 of the hoof horny wall 14. As noted, the use of the web 20 is not necessary in this invention. The volume 22 is filled with an injectable, e.g. liquid resin, forming a mass 28. Because of rapid cure of the resin, e.g. in from less than 25 seconds to less than about 2 minutes, there is no need to support the resin in place until cure as with a web 20, particularly with the faster curing resins, The terms hydraulically filled and hydraulically full herein refer to the filling with the liquid resin mass 28 of substantially all the voids, crevices and interstices of the hoof sole portion 18 including areas surrounding and covering the frog portion 30 of the hoof, and to filling the volume 22 from the hoof sole 18 to the web 20 so that incursions of debris including moisture into the volume 22 are blocked.

The resin used to form the mass 28 is desirably a highly fluid liquid which can be and preferably is injected into the volume 22 to spread throughout the volume, to contact all surfaces therein, and to adhere to such surfaces in a void eliminating manner. The resin mass 28 being comprised of solid (void-free) resin reactants and free of foam-formers will be free of voids and pockets of air or gas when cured, unlike foam systems which deliberately create voids. The resin mass 28 cures in place, i.e. in situ. Viscosities of the fluid form of the mass 28 are selected such that the incorporation of the mass into the volume 22 is quickly accomplished, in a matter of 5 to 20 seconds typically and usually less than a few minutes. Incorporation by injection rather than by hand packing as has been common with nonfluid volume fillers enables rapid distribution of the resin mass 28 through the volume 22 and the infilling of voids and interstices of the hoof bottom wall surfaces. Viscosities of less than about 25,000 and preferably less than 2500 centipoises may be used, with viscosities as low as that of water being useful. The resin can be any of the various known thermoplastic resins or thermosetting resins meeting the invention criteria of low viscosity upon incorporation such as by injection under the web, and rapid gelling or cure to a substantially solid viscosity, e.g. 100,000 centipoises. A rapidly high viscosity gives the resin mass 28 the ability to not flow from the volume 22. This increased viscosity preferably happens in 10 to 20 seconds or less than 25 seconds, but other times, up to 2 minutes or more where conditions permit, and where the foregoing handling criterion is met can be used. Resin compositions are usefully packaged in dual cartridge packages from which they may be discharged through a static mixer tip to combine into a reactive mixture which is injectable into the volume 22. For rapid cure to a sufficiently gelled state, the amount of catalyst should be selected in concert with desired cure time, e.g. 5% by weight of a urethane reaction catalyst for a 20 second cure to the adequately gelled state, with final cure occurring over the next day or so.

While resins, such as the preferred urethane resins herein may be initially tacky, this tackiness is lost upon fully curing. The preferred application method of incorporation by injection mentioned above makes tackiness or not unimportant since the resins can be injected directly under the previously applied web, if used, and no hand or spatula contact is required, even where the web is not used.

A further feature of the invention is the cure of the resin to a relatively soft and resilient state, e.g. to a hardness less and a softness greater than that of the horny portion of the hoof. Resilience of the resin is its capacity to deform and return to its undeformed condition substantially immediately and to persist in this resilient quality over substantially the life of the resin in the hoof volume 22. Typically, this resilience is achieved by selecting reactants and reaction conditions known in the art to limit the degree of final cure to such that the resin mass 28 has resiliency to a degree that under the compression of the horse's weight it will yield slightly under the web, cushioning the horse's step and promptly and persistently recovering its original dimensions.

A useful filler resin mass system is a urethane resin prepared from one or more isocyanates, catalysts, and various polyols, such as disclosed in U.S. Pat. No. 4,869,400, the disclosure of which is hereby incorporated herein. Desirably the mass 28 adheres to the hoof frog portion 30 and hoof sole portion 18, and is held in place thereby. In addition, it is desirable to have the resin mass transparent or at least sufficiently translucent so as to permit viewing the underlying hoof sole portion 18 and frog portion 30. Epoxies, polyesters, vinyl resins and other resins meeting the invention criteria can also be used. The term curing herein refers to polymerization, whether of the thermosetting or thermoplastic type, between resin components, or other processes by which a resin or resins change from a liquid to a solid state, including by loss of a diluent or solvent.

The foregoing objects of providing a hoof packing method and product that avoid debris incursions, protect the horse hoof by completely filling the voids and interstices therein, and remain resilient and cushioning are thus met.

We claim:

1. The method of protecting a horse from injury during walking or running, including filling the open volume defined by the horse hoof wall with a urethane resin having a viscosity to flow through the interstices of the hoof bottom wall by combining, from a pair of cartridges being outside said open volume, into a static mixer terminating inside said open volume, a rapidly curing urethane resin for hydraulically filling said open volume and having a viscosity such that said resin flows through the interstices of said hoof bottom wall and conforms to the contours of said hoof bottom wall, and curing said resin in situ, said resin curing to be softer than and adherent to said horse hoof bottom wall, and maintaining said resin in place during the horse walking or running.

2. The method according to claim 1, further including said urethane resin curing to a void free solid.

3. The method of protecting a horse's hoof having a hoof bottom wall forming an open volume, having the steps of:
cleaning said open volume of debris,
fixing a web over said open volume,
injecting a free flowing, rapidly curing urethane resin adherently to said hoof bottom wall under said web and into said open volume in the hoof bottom wall in conforming relation by combining, from a pair of cartridges being outside said open volume, into a static mixer terminating within said open volume, separate urethane reactive components, forming a rapidly curing urethane resin for hydraulically filling said open volume,
and curing said resin to a void free solid in situ being adherent to said hoof bottom wall.

4. The method according to claim 3, further including fixing said web in place with nails into said hoof bottom wall.

5. The method according to claim 3, further including fixing said web to said hoof with a horseshoe secured to said hoof bottom wall.

6. The method according to claim 3, further including selecting as said urethane resin having a cure time of less than about two minutes.

7. The method according to claim 6, further including selecting as said urethane resin having a cure time of less than about 25 seconds.

8. The method according to claim 3, further including adhering said resin to said web to provide protection against debris incursions between said web and said resin.

9. The method of protecting a horse's hoof, having the steps of:
cleaning the open volume formed by the hoof bottom wall of debris, injecting a rapidly curing urethane resin adherently into said open volume by combining, from a pair of cartridges being outside said open volume, into a static mixer terminating within said open volume, separate urethane resin reactive components, forming a rapidly curing urethane resin for hydraulically filling said open volume, said resin having a viscosity, such that said resin flows freely to conform to the contours of said hoof bottom wall before curing; and curing said resin to a void free solid in situ in the hoof bottom wall.

10. The method according to claim 9, wherein said open volume having an open mouth,
and including the further steps of:
fixing a web over said open volume open mouth, and thereafter injecting said urethane resin into said open volume under said web, and curing said resin.

11. the method according to claim 9 further including the step of:
selecting as said urethane resin, a urethane resin having a cure time of less than about 2 minutes,
said resin adhering to said hoof bottom wall.

12. The method according to claim 9, further including selecting a resin, which when finally cured, said resin is softer than the horny wall of said hoof, whereby said resin cushions said hoof against shock.

13. The method according to claim 1, wherein said urethane resin is transparent when cured, whereby a horse's hoof sole is visible through said resin.

14. The combination of a horse hoof and a hoof bottom wall forming an open volume, and
a void free solid urethane resin conformed with and adhered to said hoof bottom wall in volume filling relation, such that the open volume is free of unfilled voids and interstices, and said combination being formed by the method of claim 1.

15. The combination according to 14, wherein said urethane resin is sufficiently transparent such that a horse hoof sole is visible therethrough.

16. The method of protecting a horse's hoof having a hoof bottom wall forming an open volume, including combining, from a pair of cartridges being outside said open volume, into a static mixer terminating within said open volume, separate reactive resin components, forming a rapidly curing urethane resin for hydraulically filling said open volume, conforming said resin to the contours of said hoof bottom wall, and curing said resin to a void free solid in situ in said hoof bottom wall.

17. The method according to claim 16, further including adhering additional urethane resin to said hoof bottom wall during resin cure.

18. The method according to claim 16, including covering said open volume with a web being selected from the group consisting of leather, rubber or urethane resin, said web being adhered to said resin.

19. The combination of a horse hoof having a hoof and a hoof bottom wall forming an open volume, and a void free, solid urethane resin conformed with and adhered to said hoof bottom wall in volume filling relation, such that the hoof volume is free of unfilled voids and interstices, and said combination being formed according to the method of claim 16.

20. The combination according to claim 19, wherein said urethane resin within said volume is covered by a web fixed to said hoof and adhered to said resin.

21. The combination according to claim 19, wherein said urethane resin being cured, said resin is softer than the horny wall of said hoof and cushions said hoof against shock.

22. The combination according to claim 19, wherein said urethane resin is formed from reactive resin components injected into said open volume at a viscosity adapted to substantially fill interstitial spaces in said open volume and conform to said hoof bottom wall surfaces in adhering relation.

* * * * *